May 1, 1962 F. P. CALLAHAN 3,032,298
AIRPLANE FUSELAGE CONSTRUCTION WITH HELIUM LIFT
Filed Oct. 29, 1959 6 Sheets-Sheet 1
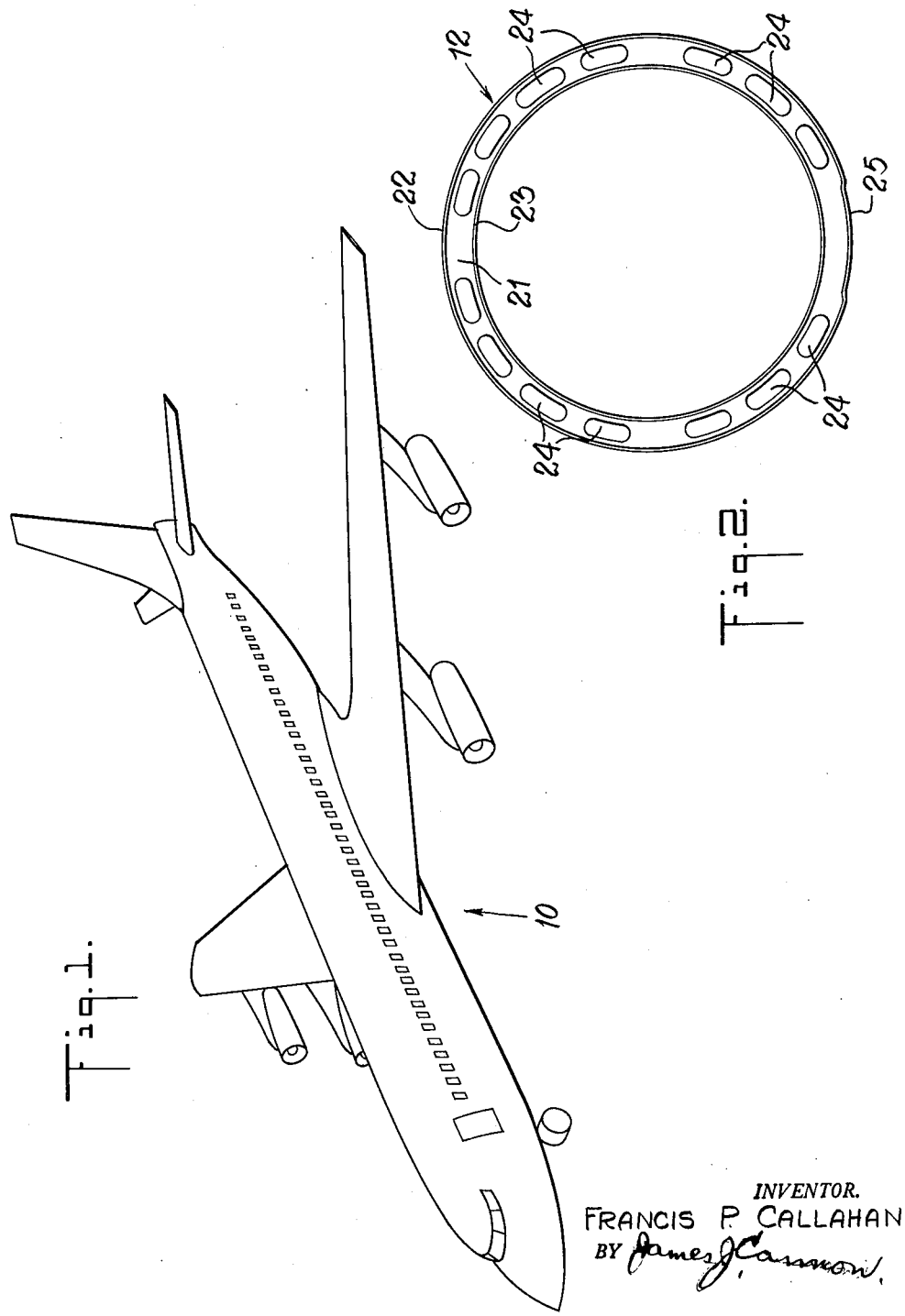
INVENTOR.
FRANCIS P. CALLAHAN
BY James J. Cannon
ATTORNEY

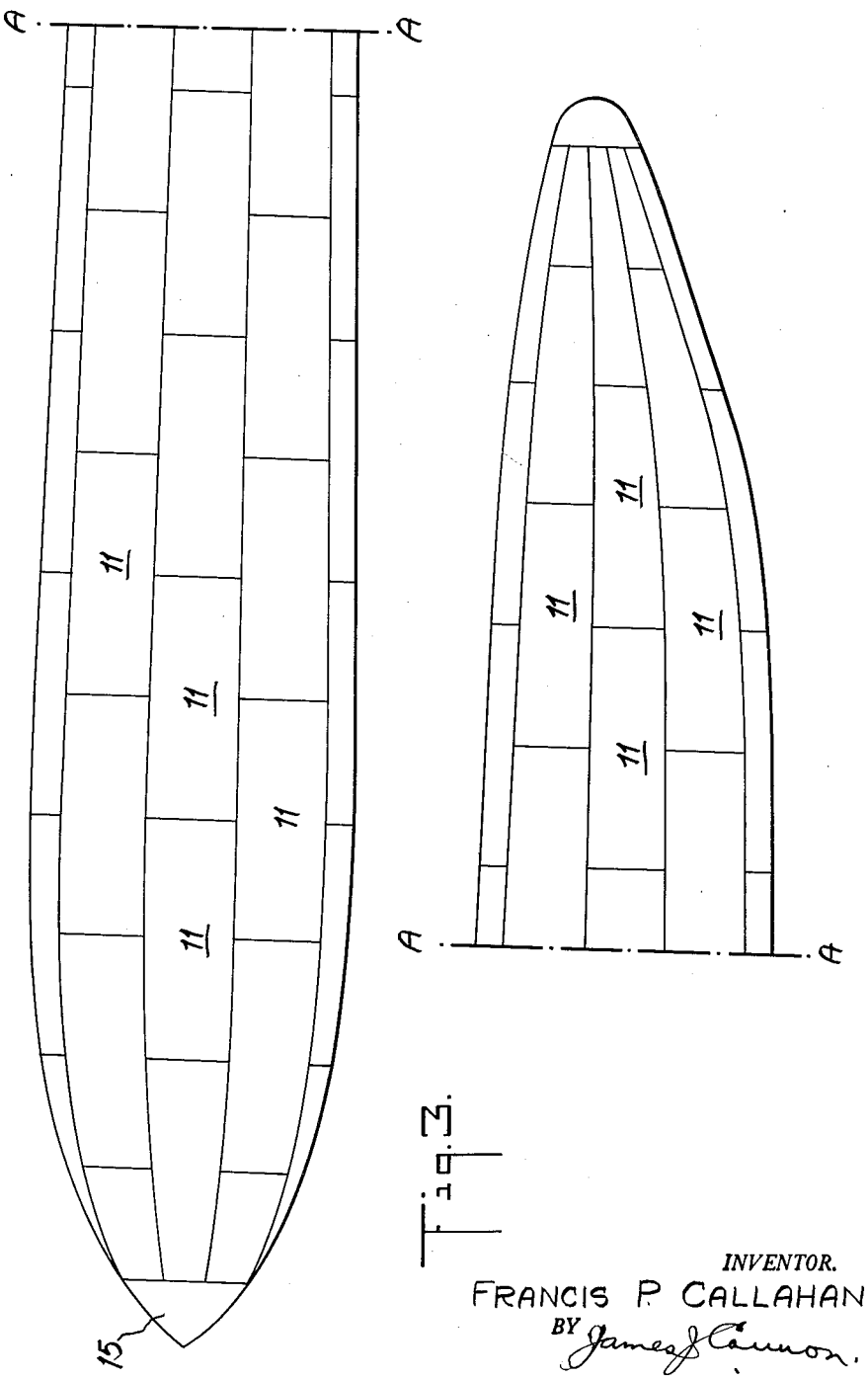

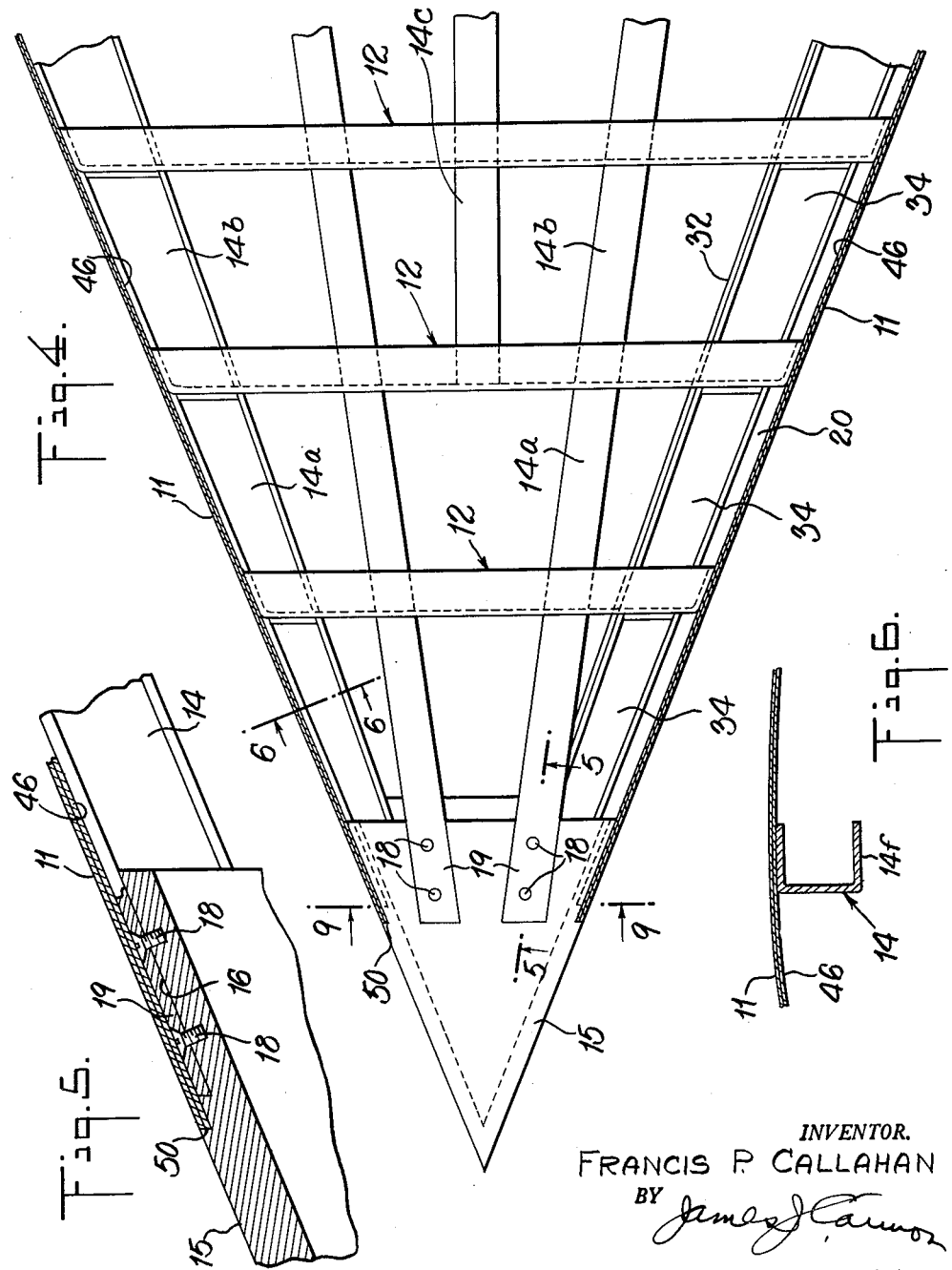

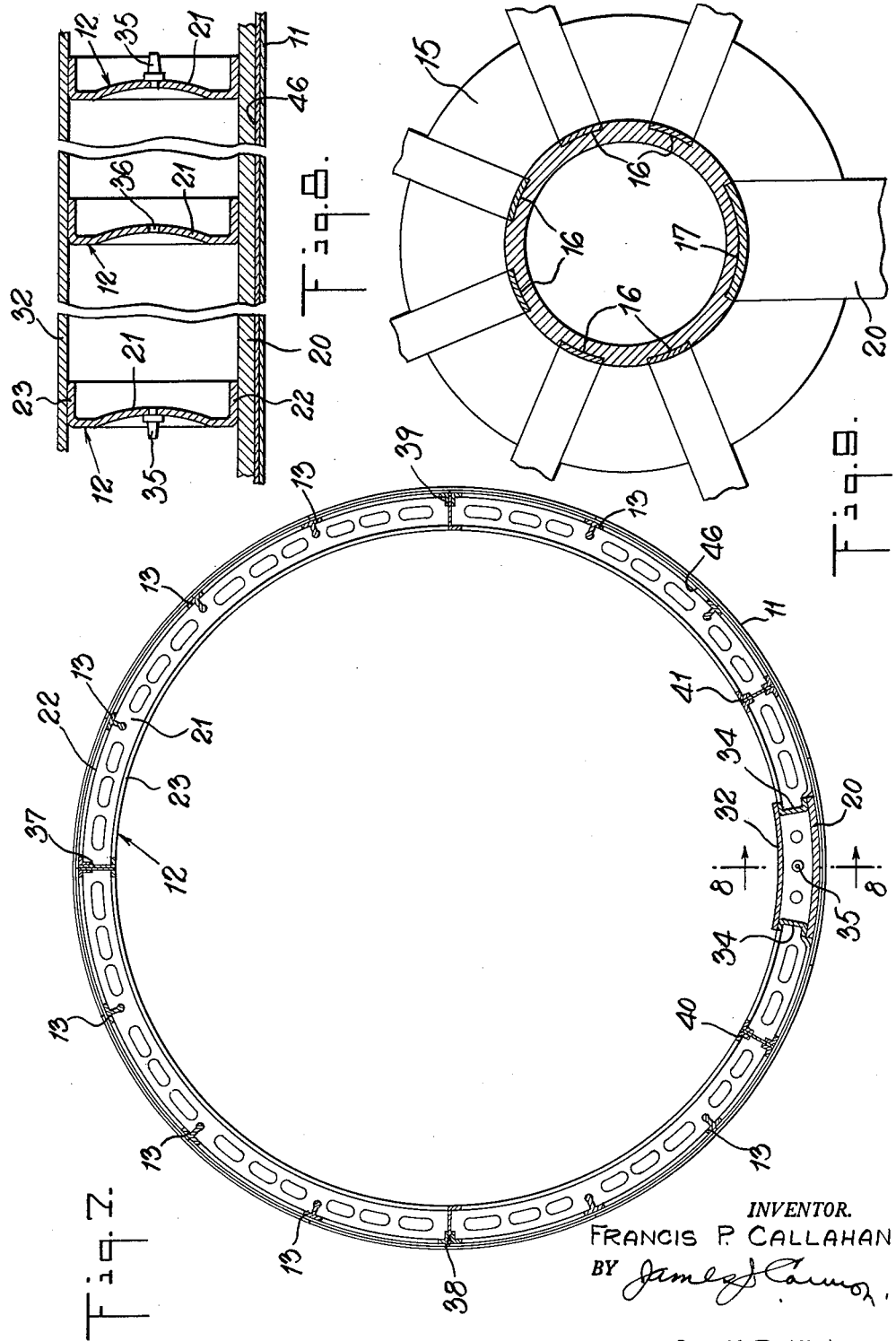

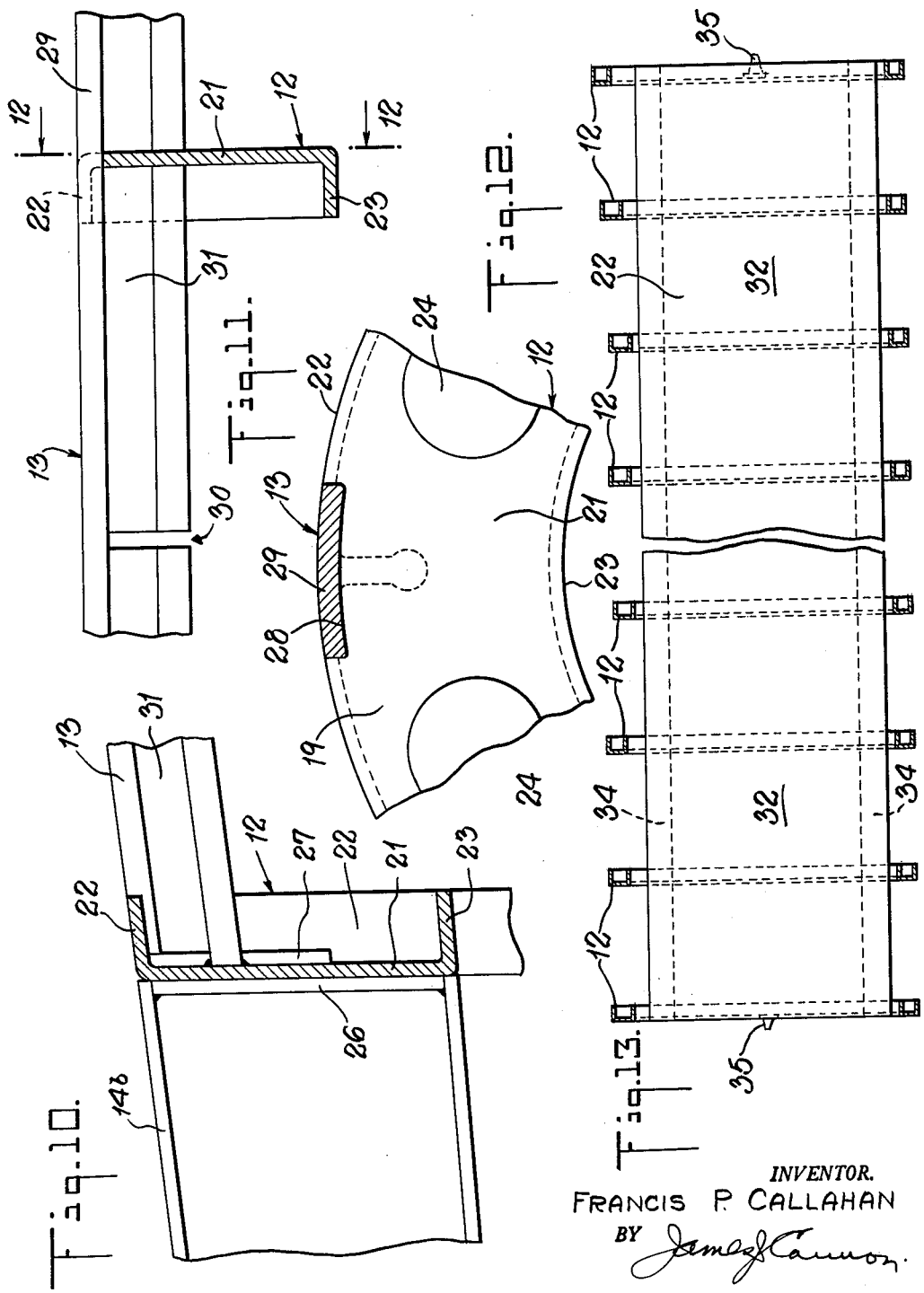

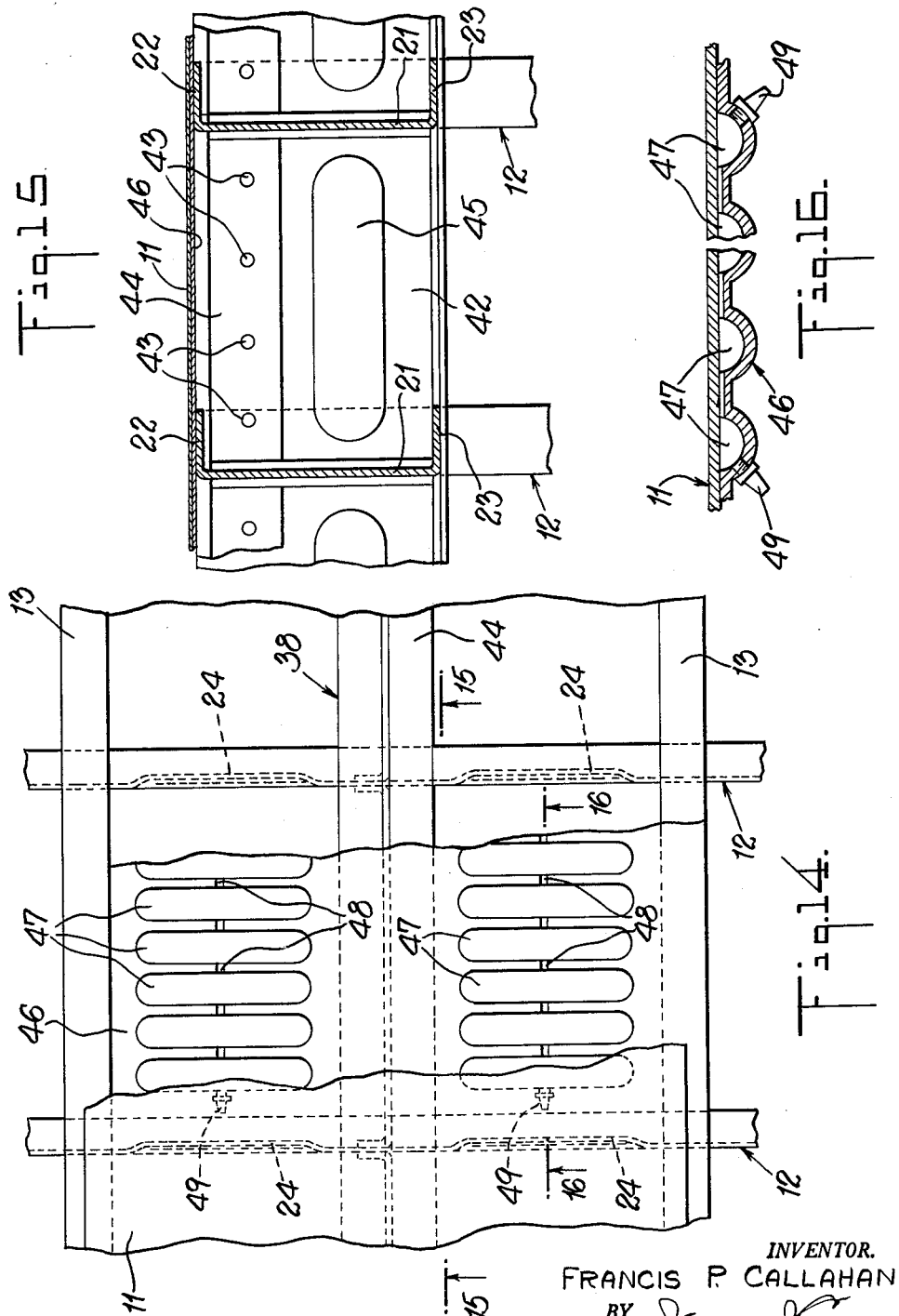

United States Patent Office 3,032,298
Patented May 1, 1962

3,032,298
AIRPLANE FUSELAGE CONSTRUCTION WITH HELIUM LIFT
Francis P. Callahan, Massapequa Park, N.Y.
Filed Oct. 29, 1959, Ser. No. 849,486
9 Claims. (Cl. 244—119)

My invention relates to airplanes and is directed particularly to improvements in fuselage construction in aircraft.

The principal object of my invention is to provide a new and improved fuselage frame construction which will be substantially stronger than fuselage frame construction presently used on commercial and military aircraft and which at the same time will be light enough in weight to be practical in application.

A more particular object of my invention is to provide, in an airplane, round or oval transverse frame members joined in spaced relation along the length of the fuselage with rigid T-bulb bar stiffeners, the stiffeners being connected to the frame members in such a manner as not to weaken the frame members.

Another object is to provide an airplane frame structure of the above nature wherein the frame members are formed with rounded stiffening depressions of "dimples" to provide maximum strength with minimum material.

Still another object is to provide an airplane frame structure of the above nature including an improved keel construction which is hollow and adapted to be filled with helium to reduce the effective weight of the fuselage.

Yet another object is to provide an airplane fuselage structure of the character described including a double layer of metal panel outer skin or sheeting, the inner sheets of which are recessed or "dimpled" to increase strength and to provide a multiplicity of closed chambers within which helium can be pumped and sealed to further reduce the weight of the fuselage.

Still another object of the invention is to provide a fuselage structure which will be practical to construct, reasonably economical to manufacture, and exceedingly resistant to the highest stresses that might be encountered even under the worst flight conditions.

Other objects, features and advantages will be apparent from the following description when read with reference to the accompanying drawings. In the drawings, wherein like reference numerals denote corresponding parts throughout the several views:

FIG. 1 is a perspective view of an airplane incorporating the features of the invention, FIG. 2 is a front view of one of the frame members, shown separately, FIG. 3 is a side elevational view of the airplane showing the manner in which the skin sheets are placed, FIG. 4 is a side elevational view, partly broken away, of the nose cone and related frame members, FIG. 5 is a cross-sectional view taken on line 5—5 of FIG. 4, FIG. 6 is a cross-sectional view taken on line 6—6 of FIG. 4, FIG. 7 is a vertical cross-sectional view through the fuselage, FIG. 8 is a longitudinal cross-sectional view through the keel section taken on line 8—8 of FIG. 7, FIG. 9 is a cross-sectional view taken on line 9—9 of FIG. 4, FIG. 10 is a detailed cross-sectional view partly in elevation of the method of fastening the various framework elements, FIG. 11 is a side elevational view of the T-bulb bar and frame, FIG. 12 is a cross-sectional view taken on line 12—12 of FIG. 11, FIG. 13 is a plan view looking down at the keel section of fuselage, FIG. 14 is a plan view, partly broken away, of the frame members, and the inside and outside sheets assembled thereto, FIG. 15 is a cross-sectional view taken on line 15—15 of FIG. 14, and FIG. 16 is a fragmentary section taken on line 16—16 of FIG. 14.

Referring now in detail to the drawings, FIG. 1 illustrates, in perspective, a jet aircraft 10 incorporating the improved fuselage construction of my invention consisting of a plate the same width as the frame tied into each frame member and angled at the outside running the entire length of the fuselage having a flanged lip 14f (FIGURE 6) on the inside longerons in case inside sheeting is applied and for stiffening purposes. FIG. 3 illustrates the fuselage of the aircraft 10 separately, showing the manner in which the rectangular outer skin sheet sections 11 are placed on the fuselage framework.

The novel fuselage framework embodying my invention (see FIG. 7) comprises plurality of circular frame members 12 secured in spaced parallel relation by connection with a plurality of longerons 37 through 41, a plurality of T-bulb bar stiffeners 13 peripherally arranged about said frame members, and a plurality of U-bar longerons 14 (see FIG. 5) at each end of the fuselage framework, as is hereinbelow more fully described.

Referring to FIGS. 4, 5 and 9, the improved framework, beginning at the front end of the fuselage, comprises a hollow conical nose cone 15, preferably fabricated of a lightweight metal such as aluminum, the outer periphery of the base of which is provided with six equal wide longitudinal slots 16 and a single wider slot 17, all equidistantly spaced about the base of the nose cone. Seated within each of the longitudinal slots 16 and secured in place as by screws 18 is the outer web portion 19 of one each of the U-bar longerons 14. Seated in place within the longitudinal slot 17 and secured therein by screws (not illustrated) in an outer keel plate 20 forming part of a keel assembly extending along the entire length of the fuselage, as hereinbelow more fully described.

As illustrated in FIGS. 2, 7, 11 and 12, the circular frame members 12 are U-shaped in cross-section to provide a central web portion 21 and outer and inner spaced parallel side portions 22 and 23, respectively. The web portion 21 of each of the frame members 12 is stamped or otherwise formed with a plurality of elongated, rounded indentations or "dimples" 24 giving added rigidity to the frames. As best illustrated in FIG. 2, each frame member 12 is recessed at its outer side portion 22 as indicated at 25 to receive seated therein the outer keel plate 20.

As illustrated in FIG. 4, the U-bar longerons 14 (FIGS. 5 and 6) and the outer keel plate 20 extending from the nose cone 15 as hereinabove described, extend to the first frame member 12 which is disposed in spaced parallel relation to the base of said nose cone, and are securely welded thereto. Similarly, U-bar sections 14a and 14b are welded between the first and second, and second and third frame members, respectively, securing them in spaced parallel relation, the spacing distance of said frames being preferably about 15½ inches, center to center. The fuselage will have increased sufficiently in diameter between the second and third frame members 12 to add additional U-bar sections 14c (FIG. 4) for additional strength.

T-bulb bar members 13 of continuous length will be used as longitudinal stiffener and structural elements for all but the endmost portions of the fuselage structure, where U-bar longerons are used instead as described above. The main top and sides and bottom longerons are at an angle. The end of sheets also have T-bolt bars welded therein. (See 40—41 FIG. 7.) As illustrated in FIG. 10 the T-bulb bar stiffeners will begin at about the third frame member 12 from the front, and end at about the third frame member from the tail end (not illustrated). The inner ends of the U-bar longerons 14b are preferably welded to end reinforcing plates 26 and to the outside of the connecting frame 12, and the outer ends of the T-bulb bar stiffeners 13 are preferably welded to end reinforcing plates 27 and to the inside of said connecting frame 12 to provide a rigid structure (see FIG. 10).

As ilustrated in FIGS. 11 and 12, the outer side portions 22 of the frame members 12 are cut away, as indicated at 28 (FIG. 12), to allow seating therein of the rectangular head portions 29 of the T-bulb bar stiffeners 13, while transverse slots 30 (FIG. 11) are cut into the web and bulb portions 31 of said T-bulb bar longerons 13 to receive in interfitting relation the web portions 19 of said frame members. The junctures between frame members 12 and the T-bulb bar stiffeners are welded so that the fuselage framework members 12 and the T-bulb bar stiffeners 13 will be strengthened, rather than weakened, at each juncture.

In addition to the outer keel plate 20, the keel assembly, which extends substantially the full length of the fuselage, comprises an inner keel plate 32 coextensive with said outer keel plate and welded against the inner side portions 23 of the frame members 12 in spaced parallel relation to said outer keel plate (see FIGS. 7, 8 and 13). The sides of the keel structure between the outer and inner keel plates 20, 32 and between the frame members 12 are sealed off by channel plates 34, as illustrated in FIG. 7, to provide compartments within the keel structure. As illustrated in FIG. 8, the end frame members 12 are fitted with valves 35 and the intermediate frame members 12 are drilled as indicated at 36 so that helium can be pumped into the keel structure throughout substantially its entire length for reducing the net weight of the fuselage.

As illustrated in FIGS. 7, 8, 14 and 15, the fuselage framework between the frame members 12 also comprises a main top longeron 37, main side longerons 38, 39, and main bottom longerons 40, 41 spaced outwardly of each side of the keel structure. The longerons 37, 38, 39, 40 and 41 are each comprised of web sections 42 which extend from frame to frame between the outer and inner side portions 22, 23 thereof. The outer edge portions of each longeron section are riveted as indicated at 43 or otherwise securely fixed between L-shaped members 44 the ends of which are in turn secured to the frame members. Each web section 42 is formed with an elongated, smoothly rounded depression or "dimple" 45 for stiffening and strengthening purposes.

Means is provided for strengthening the outer skin or sheeting of the fuselage, and at the same time reducing the effective weight thereof by the inclusion of helium filled pockets. To this end the inner sheet sections 46, which are preferably .050 inch in thickness are each formed with a plurality of rows of elongated depressions or "dimples" 47 which are interconnected by small passages 48. As illustrated in FIG. 14, the depressions 47 are of such size and so arranged that when the inner sheet sections are fitted and secured in place upon the above-described framework, said depressions will extend without obstruction into the open spaces between the frame members, longerons and T-bar bulb stiffeners. As illustrated in FIG. 16, the end depressions 47 of each row are fitted with valve 49. When the outer sheet sections 11, which may be .040 inch in thickness for example, are fitted and secured in place over the inner sheet sections 46, as illustrated in FIGS. 14 and 16, depressions 47 will be sealed off to form rows of interconnected pockets or chambers which will be filled with helium to reduce the net weight of the fuselage, also to add greater strength to the outer skin of the fuselage.

As illustrated in FIGS. 5 and 6, the periphery of the base of the nose cone 15 is undercut and scarfed, as indicated at 50, so that the outer skin sheet sections will be secured flush with the surface of said nose cone.

It will be understood by those skilled in the art that the invention permits of various embodiments, modifications, and uses other than those herein specifically described without departing from the essential features of the invention as set forth in the claims annexed hereto.

What is claimed as new and for which it is desired to secure Letters Patent is:

1. In a fuselage construction, the combination comprising, a plurality of transverse frame members in the form of a loop, a plurality of longerons interconnecting said frame members and securing them in spaced parallel relation, said frame members being U-shaped in cross-section to provide a central web portion integrally formed with parallel inner and outer side wall portions, and a plurality of T-bulb bar members extending longitudinally of and interconnecting said frame members for frame stiffening purposes, the outer side portions of said frame members along the bottom portions thereof being inwardly recessed, an outer keel plate seated within said bottom recesses of said frame members and being secured to said frame members, an inner keel plate secured to said inner side portions of said frame members in spaced parallel relation to said outer keel plate, means for partitioning off the space between said keel plates, and means for filling said space between said keel plates with helium for reducing the net weight of the fuselage.

2. The fuselage construction as defined in claim 1 wherein said helium filling means comprises a valve fitted in each of the end frame members in communication with the space between said inner and outer keel plates, and openings in said web portions of the frame members between said end frame members and between said keel plates to allow passage of gas from one end to the other of the space between said keel plates.

3. The fuselage construction as defined in claim 2 wherein said T-bulb bar members each comprises a head portion integrally formed with a bulb portion, and wherein the interconnecting junctures between said frame members and said T-bulb bar members each comprises a cut-out in the outer side wall portion of a frame member adapted to receive a head portion, and a slot in said bulb portion adapted to receive a central web portion of said frame member.

4. The fuselage construction as defined in claim 3 wherein the central web portions of said frame members are each formed with a plurality of rounded indentations for strengthening purposes.

5. In a fuselage construction the combination comprising a plurality of transverse frame members in the form of a loop, a plurality of longerons interconnecting said frame members and securing them in spaced parallel relation and having an inner lip portion for the purpose of strengthening the said frame, said frame members being U-shaped in cross-section to provide a central web portion integrally formed with parallel inner and outer side wall portions, a plurality of T-bulb bar members extending longitudinally of and interconnecting said frame members for frame stiffening purposes, a first skin covering of inner sheet metal sections secured over the framework provided by said frame members, said longerons and said T-bulb bar members, a second skin covering of outer sheet metal sections secured upon said inner sections, and means providing a plurality of chambers between said outer and inner sheet metal sections filled with a lighter than air gas to reduce the net weight of the fuselage.

6. The fuselage construction as defined in claim 5 wherein said chambers providing means comprises a plurality of rows of elongated indentations formed in said inner sheet sections, gas communication means between said elongated indentations of each row, and a valve in the end ones of the indentations in each row for pumping gas into the chambers formed by said indentations faced by said outer sheet sections.

7. The fuselage construction as defined in claim 6 additionally comprising inner and outer heel plates and helium filling means including a valve fitted in each of the end frame members in communication with the space between said inner and outer keel plates, and openings in said web portions of the frame members between said end frame members and between said keel plates to allow passage of gas from one end to the other of the space between said keel plates.

8. The fuselage construction as defined in claim 7 wherein said T-bulb bar members each comprises a head portion integrally formed with a bulb portion, and wherein the interconnecting junctures between said frame members and said T-bulb bar members each comprises a cut-out in the outer side wall portion of a frame member adapted to receive a head portion, and a slot in said bulb portion adapted to receive a central web portion of said frame member.

9. The fuselage construction as defined in claim 8 wherein the central web portions of said frame members are each formed with a plurality of rounded indentations for strengthening purposes.

References Cited in the file of this patent

UNITED STATES PATENTS

| | | |
|---|---|---|
| 1,301,981 | Smith | Apr. 29, 1919 |
| 1,419,446 | Bogert | June 13, 1922 |
| 1,972,005 | Berbeck | Aug. 28, 1932 |
| 2,116,953 | Sambraus | May 10, 1938 |
| 2,233,969 | Woods | Mar. 4, 1941 |
| 2,394,259 | Perrine | Feb. 5, 1946 |
| 2,741,447 | Heal | Apr. 10, 1956 |

FOREIGN PATENTS

| | | |
|---|---|---|
| 958,796 | France | Sept. 19, 1949 |
| 731,515 | Great Britain | June 8, 1955 |

OTHER REFERENCES

Flight Magazine, Jan. 25, 1945, pg. 96.